UNITED STATES PATENT OFFICE.

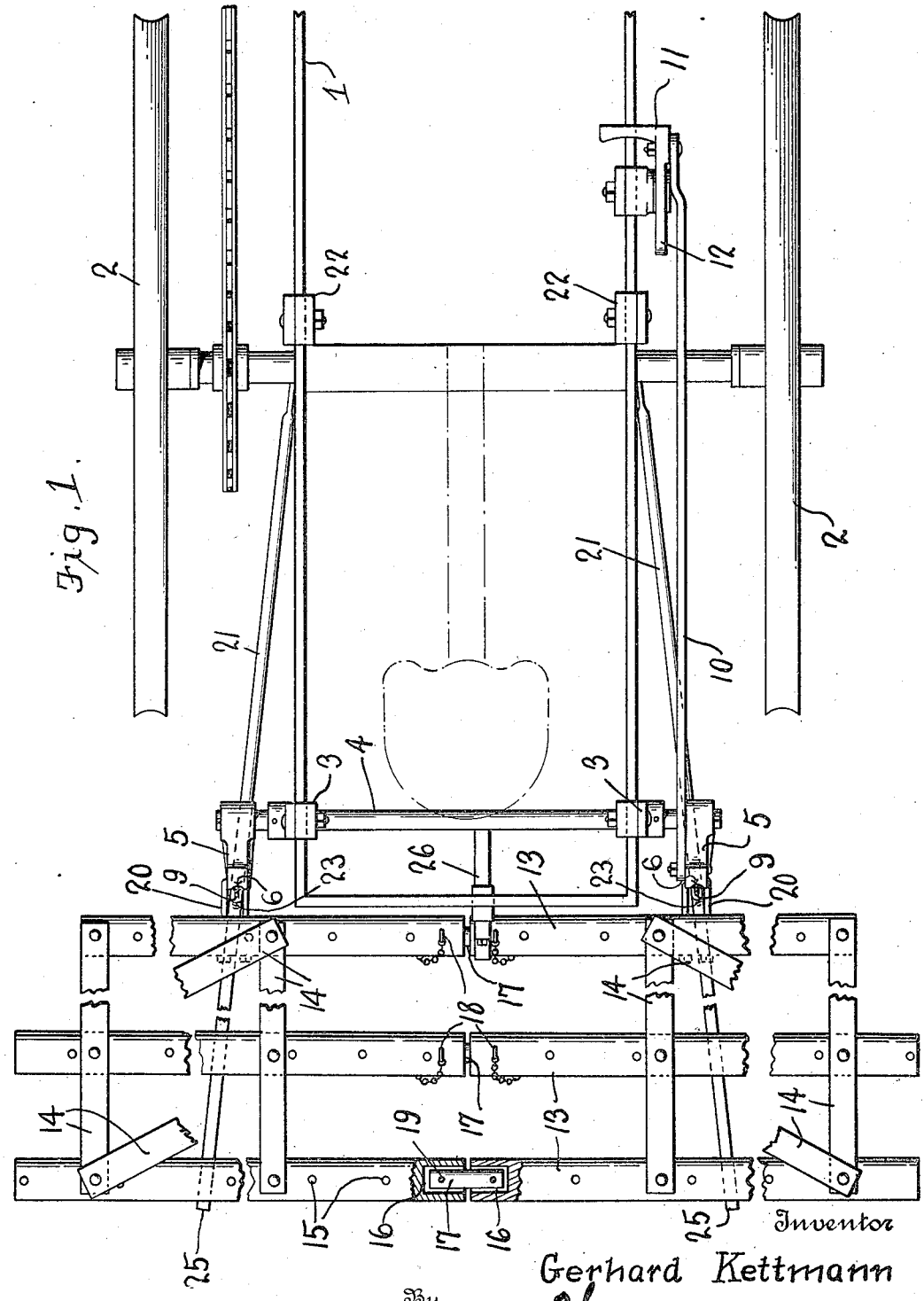

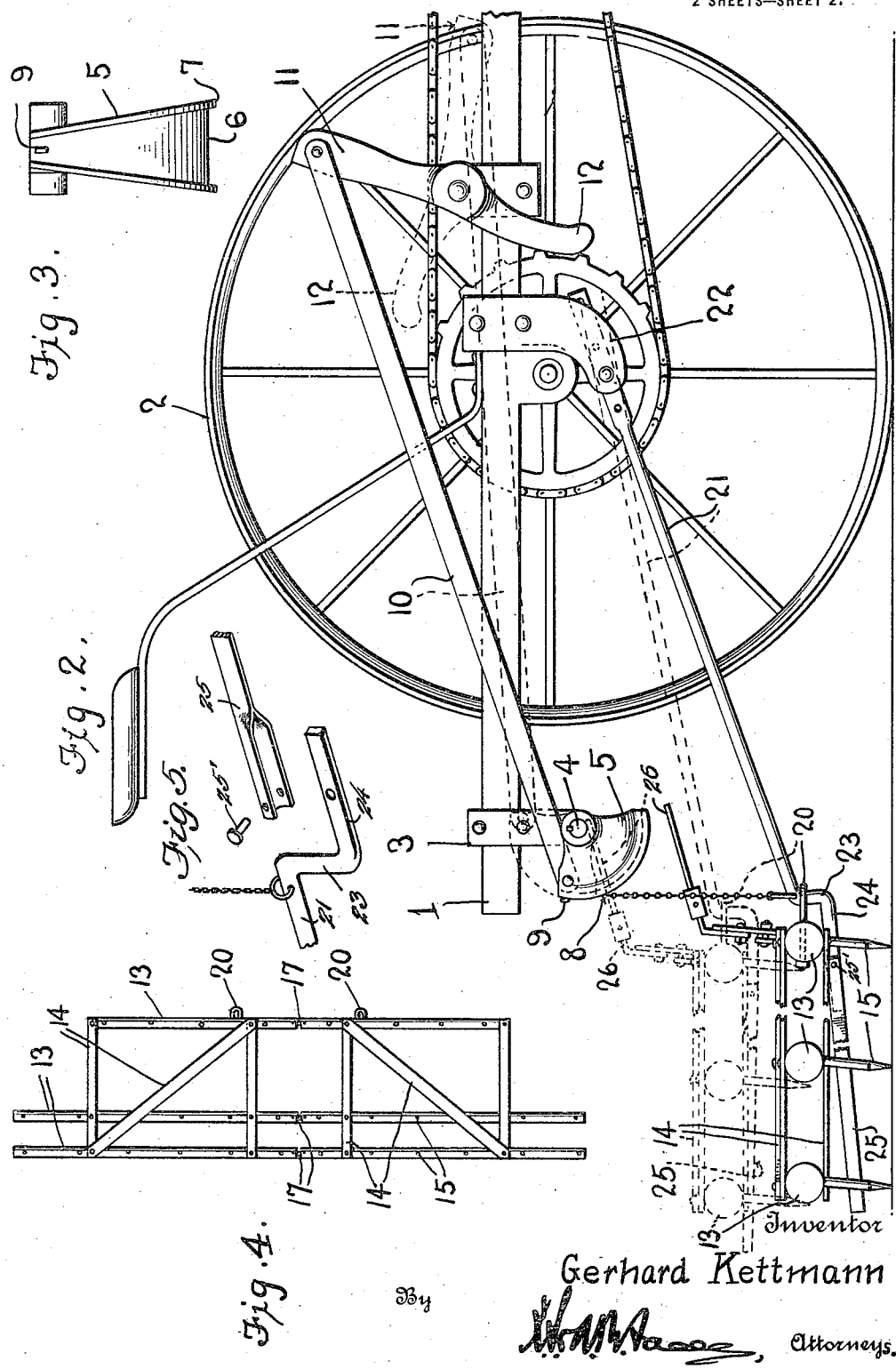

GERHARD KETTMANN, OF MANNING, IOWA.

HARROW ATTACHMENT FOR PLANTERS.

1,263,070.  Specification of Letters Patent.  Patented Apr. 16, 1918.

Application filed June 20, 1917. Serial No. 175,947.

*To all whom it may concern:*

Be it known that I, GERHARD KETTMANN, a citizen of the United States, residing at Manning, in the county of Carroll and State of Iowa, have invented certain new and useful Improvements in Harrow Attachments for Planters, of which the following is a specification.

This invention has for its object the provision of means whereby a harrow may be attached to and drawn over a field in rear of a planter so that the harrowing of the soil may be accomplished simultaneously with the planting of the seed. Secondary objects of the invention are to provide means whereby the harrow will be supported in its operative position and may be readily elevated when it is desired to turn a corner or move from one field to another field; to provide means whereby excessive lateral movement of the harrow will be prevented, and to so construct the lifting devices that they will also serve as rudders or guides for the harrow. All these stated objects and such other objects as will incidentally appear in the course of the following description are attained in mechanism of the characteristics illustrated in the accompanying drawings and the invention resides in certain novel features which will be particularly pointed out in the claims following the detailed description.

In the annexed drawings:

Figure 1 is a plan view of a portion of a planter showing my improved harrow attachment connected therewith;

Fig. 2 is a side elevation of the same;

Fig. 3 is a detail rear elevation of a portion of the harrow lifting and supporting mechanism;

Fig. 4 is a detail plan view of the harrow.

Fig. 5 is a detail perspective view showing the connection between a draft bar and a runner.

The planter frame is indicated by the reference numeral 1 and may be of any well known or preferred type, being supported upon ground wheels 2 and equipped with mechanism actuated by the axle to operate the seed dropping mechanism.

In carrying out my invention, I secure to the side bars of the planter frame, adjacent the rear ends thereof, brackets 3 having a rock shaft 4 journaled in their lower ends, said rock shaft extending across the rear end of the planter frame and being equipped with segments 5 on its ends, as shown. The said segments have grooved peripheral surfaces, indicated at 6, and these surfaces are flared or provided with diverging side flanges 7 extending from the normally upper rear corner to the normally lower forward corner thereof so as to accommodate the lateral movement of the suspending devices 8 which are attached at their upper ends to the eyes 9 provided at the upper rear corners of the segments. To one of the segments, at the inner side of the same and at the upper rear corner thereof, I pivot the rear end of a link 10 which extends forwardly and has its front end pivoted to the upper end of a foot lever 11 fulcrumed in any convenient manner upon the planter frame at such a point that it may be easily reached by the foot of the driver. This foot lever is extended below its fulcrum, as indicated at 12, so that it will be counterbalanced and move easily and without undue exertion upon the part of the driver.

The harrows may be of any desired construction, but will generally consist of tooth bars 13 disposed transversely of the line of travel and in parallel relation and connected by braces 14. The harrow teeth 15 will be secured in the tooth bars and will depend therefrom so as to engage the surface of the ground in the usual manner. The tooth bars 13 may, of course, be of any desired length but I have found it advantageous to employ three bars with the front bar shorter than and a considerable distance in advance of the other two bars. The bars will preferably be constructed in sections having sockets 16 in their meeting ends to receive coupling bars 17, retaining pins 18 being inserted through registering openings 19 in the ends of the tooth bars and the couplings so as to retain the sections of the tooth bar in perfect alinement. This construction will facilitate storage of the harrow and will also, when the harrow is in use, hold the tooth bars in perfect alinement and prevent relative movement of the same. To the front tooth bars, I secure the clevises 20 which project forwardly. Draft bars 21 are pivoted at their front ends to the brackets or hangers 22 secured to and depending from the planter frame and these draft bars extend downwardly to a point just in advance of the front tooth bar 13 where they are bent to provide shoulders 23 which pass through the clevises 20 and thereby apply the draft of the machine to the clevises so that the harrows will be held close to the planter frame and will be drawn over the field without strain upon the lifting chains 8 which will generally be attached to the draft bars and are so illustrated. Below the shoulders 23, the draft bars are turned rearwardly to project under the tooth bars of the harrow, as shown at 24, and upon these rearwardly turned portions, I pivot the runners 25 by pins 25'. As indicated by dotted lines in Fig. 2 and shown clearly in Fig. 5, the rear ends of the draft bars extend beyond the pivot pins 25' into the front ends of the runners and thereby limit the downward movement of the runners so that no matter how deep the harrow teeth may penetrate, the runners will only engage the top of the soil sufficiently to counteract lateral movement of the harrow and will not bury themselves in the earth so as to increase the draft. When the draft bars are raised the runners will of course be carried upwardly by the engagement of their front portions with the upper sides of the rear ends of the draft bars and consequently will aid in supporting the harrow in the elevated position. The said runners 25 may ride upon the surface of the ground and will thereby aid in guiding the harrows and will also tend to clear the harrow teeth of any trash which might tend to accumulate in front of the same. Moreover, the rear ends of these runners will tend to take into the ground and thereby prevent lateral movement of the harrows.

The use of the apparatus will, it is thought, be readily understood. The harrow and its connections are secured to the planter in the manner shown and above described. As the planter is drawn over the field, the harrow will, of course, travel directly in rear of the same. The harrow will, of course, travel close behind the planter and will pulverize the surface soil and throw the same over the seed so that the cultivation will start simultaneously with the planting. The harrow will be prevented from a swaying motion by reason of the draft bars 21 engaging the clevises 20 and as the said draft bars are rigid and pivoted for vertical movement only, lateral movement of the harrows will be exceedingly slight. If it be desired to raise the harrows, the driver presses forward upon the foot lever 11 and thereby exerts a forward pull through the link or connecting bar 10 which in turn acts upon the segment 5 so as to rock the shaft 4, the segments at both ends of the shaft being thereby rocked in unison to pull upward and forward upon the chains 8 so that the harrow will be lifted. It may sometimes be desirable to provide the harrows with a counterbalance 26 so that they will move upwardly easily and will be supported in their upper position without excessive strain upon the chains. The drawings show the counterbalance in the form of a weighted arm but the weight is not essential and may be omitted. In actual practice it is desirable to have the arm so adjusted and of such length that when the harrow is raised the arm will bear against the under side of the shaft 4 and thereby serve as a bracing support for the harrow. It may be noted that when the harrow has been fully raised, as indicated by the dotted lines in Fig. 2, the lever 11 and the link or connecting bar 10 will be in such positions that the link will be on a dead center, the end 12 of the lever being above the frame of the planter. The harrows will then be supported positively in the raised position and the teeth will not be apt to come in contact with the ground. When it is desired to lower the harrow a slight pressure by the foot upon the lower end 12 of the lever 11 will release said lever and permit the harrow to descend. The upward movement of the suspending chains or cables will, of course, cause the draft bars to swing upwardly inasmuch as the clevises will be thereby drawn against the under surfaces of the draft bars and the rearwardly extending portions of the draft bars with the runners pivoted thereto will be caused to exert a lifting action against the under surfaces of the harrow tooth bars so that the harrows will be raised and supported in raised position without requiring excessive effort from the driver.

Having thus described the invention, what is claimed as new is:

1. An attachment for planters comprising a harrow, clevises extending forwardly from the harrow, a rock shaft mounted upon the planter frame above the harrow, means for actuating said rock shaft, draft bars pivotally mounted on the planter frame and extending through the clevises and under the harrow, and means connected with and controlled by the rock shaft for lifting the draft bars.

2. An attachment for planters comprising a harrow, draft bars pivotally mounted at their front ends on the planter frame and having their rear portions connected with and projecting under the harrow, and means for raising the draft bars.

3. An attachment for planters comprising a harrow, clevises on the front side of the harrow, draft bars pivotally supported by the planter frame at their front ends and provided at intermediate portions with shoulders extending through and engaging the clevises, runners pivotally connected to and extended rearwardly from the draft bars under the harrow, and means connected with the draft bars for raising and lowering the same.

4. An attachment for planters comprising a harrow, a rock shaft mounted upon the planter frame above the harrow, segments at the ends of said rock shaft, an operating lever mounted on the planter frame in advance of the rock shaft, a link connecting said lever with one of the segments, draft bars pivotally mounted on the planter frame at their front ends and having their intermediate portions connected with the harrow and their rear portions extending under the harrow, and flexible supports secured upon said segments and depending therefrom and secured to the draft bars.

In testimony whereof I affix my signature.

GERHARD KETTMANN. [L. S.]

Copies of this patent may be obtained for five cents each, by addressing the "Commissioner of Patents, Washington, D. C."